US005363653A

United States Patent [19]

Zimmermann et al.

[11] Patent Number: 5,363,653

[45] Date of Patent: Nov. 15, 1994

[54] CYLINDRICAL COMBUSTION CHAMBER HOUSING OF A GAS TURBINE

[75] Inventors: Achim Zimmermann, Mülheim a.d. Ruhr; Karl-Erhard Beck, Berlin; Klaus D. Mohr, Wuppertal, all of Germany

[73] Assignee: Man Gutehoffnungshutte AG, Oberhausen, Germany

[21] Appl. No.: 88,311

[22] Filed: Jul. 7, 1993

[30] Foreign Application Priority Data

Jul. 8, 1992 [DE] Germany ............................ 4222391

[51] Int. Cl.[5] ............................................ F02C 3/14

[52] U.S. Cl. ........................................ 60/751; 60/760

[58] Field of Search .................. 60/39.37, 39.464, 751, 60/752, 760, 722, 754

[56] References Cited

U.S. PATENT DOCUMENTS

| | | | |
|---|---|---|---|
| 2,541,170 | 7/1946 | Mayers et al. . | |
| 2,669,090 | 2/1968 | Jackson . | |
| 2,692,478 | 10/1954 | Hill | 60/752 |
| 3,368,604 | 2/1968 | Mutchler . | |
| 4,719,748 | 1/1988 | Davis et al. | 60/760 |
| 4,872,312 | 10/1989 | Iizuka et al. | 60/760 |
| 4,903,477 | 2/1990 | Butt | 60/760 |

FOREIGN PATENT DOCUMENTS

| | | | |
|---|---|---|---|
| 1091745 | 9/1953 | France . | |
| 2439362 | 5/1980 | France . | |
| 1123868 | 2/1962 | Germany . | |
| 1224095 | 9/1966 | Germany . | |
| 637223 | 5/1950 | United Kingdom . | |
| 736635 | 9/1955 | United Kingdom | 60/760 |

*Primary Examiner*—Louis J. Casaregola

*Attorney, Agent, or Firm*—McGlew and Tuttle

[57] ABSTRACT

A cylindrical combustion chamber housing of a gas turbine, in which the compressor air is fed into the lower, conical part of the combustion chamber housing, the perforated cone (5), through a lateral, arc-shaped inlet elbow (2). The inlet elbow (2) is directly joined by the intake distribution element (1), in which the compressor air is led around the perforated cone (5) on both sides. The tangential flow is converted around a cone into an axial flow through the holes (7) in the perforated cone (5). The conversion of the direction of flow of the compressor air is supported by radially arranged ribs (3). As a result, optimal cooling of the entire injector tube (6) is achieved, while the pressure drop in the air feed area (1, 2 and 5) is minimized, and the efficiency of the gas turbine is increased at the same time.

12 Claims, 3 Drawing Sheets

CYLINDRICAL COMBUSTION CHAMBER HOUSING OF A GAS TURBINE

FIELD OF THE INVENTION

The present invention pertains to a cylindrical combustion chamber housing of a gas turbine, with a bladeless inlet elbow and with a narrowing annular channel arranged around the combustion chamber housing for admitting compressor air through openings into the interior of a combustion chamber.

BACKGROUND OF THE INVENTION

In the prior-art combustion chamber housing of a gas turbine, the compressor air flows from a bladeless rectangular elbow into a narrowing annular channel and from there through three rectangular openings distributed unevenly on the circumference into the interior of the combustion chamber housing, and it impacts the flame tube there.

A relatively high pressure drop develops in this design in the rectangular elbow, the feed area, and a nonuniform flow distribution develops on entry of the compressor air into the interior of the combustion chamber.

SUMMARY AND OBJECTS OF THE INVENTION

The primary object of the present invention is to achieve uniform distribution of air as well as sufficient cooling and inner cone, of the injector tube, to minimize the pressure drop in the feed area, and to further improve the efficiency of the gas turbine by converting a tangential flow into an axial flow in the combustion chamber housing.

According to the invention a cylindrical combustion chamber housing of a gas turbine is provided with a lower conical part of the combustion chamber housing designed as a conical perforated cone, which is arranged circularly or coaxially around an inner conical injector tube.

A bladeless inlet elbow, with a narrowing annular channel is arranged around the combustion chamber housing for admitting compressor air through openings of the perforated cone into the interior of the combustion chamber, the inlet elbow being formed as an arc-shaped inlet elbow arranged laterally to the combustion chamber housing and attached to the lower conical part of the combustion chamber housing. Flow distribution means are provided for distribution of the flow from the arc-shaped inlet elbow to the openings of the perforated cone and into the interior of the combustion, and for converting tangential flow to axial flow. The flow distribution means also includes a substantially circular intake element or intake heart which is led on both sides around the lower conical part of the combustion chamber housing.

In the device according to the present invention, the compressor air is fed into the lower, conical part of the combustion chamber housing, namely, the perforated cone, through a lateral, arc-shaped inlet elbow. The inlet elbow is directly joined by an intake heart or flow distribution means, in which the compressor air is led around the perforated cone on both sides.

The conversion of this tangential flow into an axial flow around a cone through the holes in the perforated cone is achieved by reducing the cross section of the intake distribution means, i.e., the cross-sectional area between the perforated cone and the circumferential intake element, in the area between the inlet elbow and the flow divider. The reduction of the cross section is selected to be such that the velocity of air always remains approximately equal.

The remaining cross section of the intake distribution means thus decreases continuously toward the opposite side of the inlet elbow. The two air flows again meet at this point at the flow divider. The compressor air flowing through the holes of the perforated cone strikes the likewise conical injector tube in the interior of the combustion chamber housing and uniformly cools it.

Since the flow coefficient $CD_A$ of a hole with axially parallel flow (front area of the perforated cone) differs from the flow coefficient $CD_W$ of a hole with wall-parallel flow (lateral and rear area) ($CD_A > CD_W$), the holes in the perforated cone are arranged and dimensioned such that the open cross section of the holes increases both from front to rear and from top to bottom.

The conversion of the tangential flow into an axial flow and the uniform cooling of the injector tube, which is achieved as a result, is supported by the six radially arranged ribs. This arrangement prevents the compressor air flowing from the bottom through the inlet elbow and obliquely upward and to the rear from cooling only a limited area of the injector tube, and from cooling the rear, lower area of the injector tube only insufficiently if at all.

Optimal cooling of the injector tube is achieved by the arrangement according to the present invention, while the pressure drop over the air feed area is minimized.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
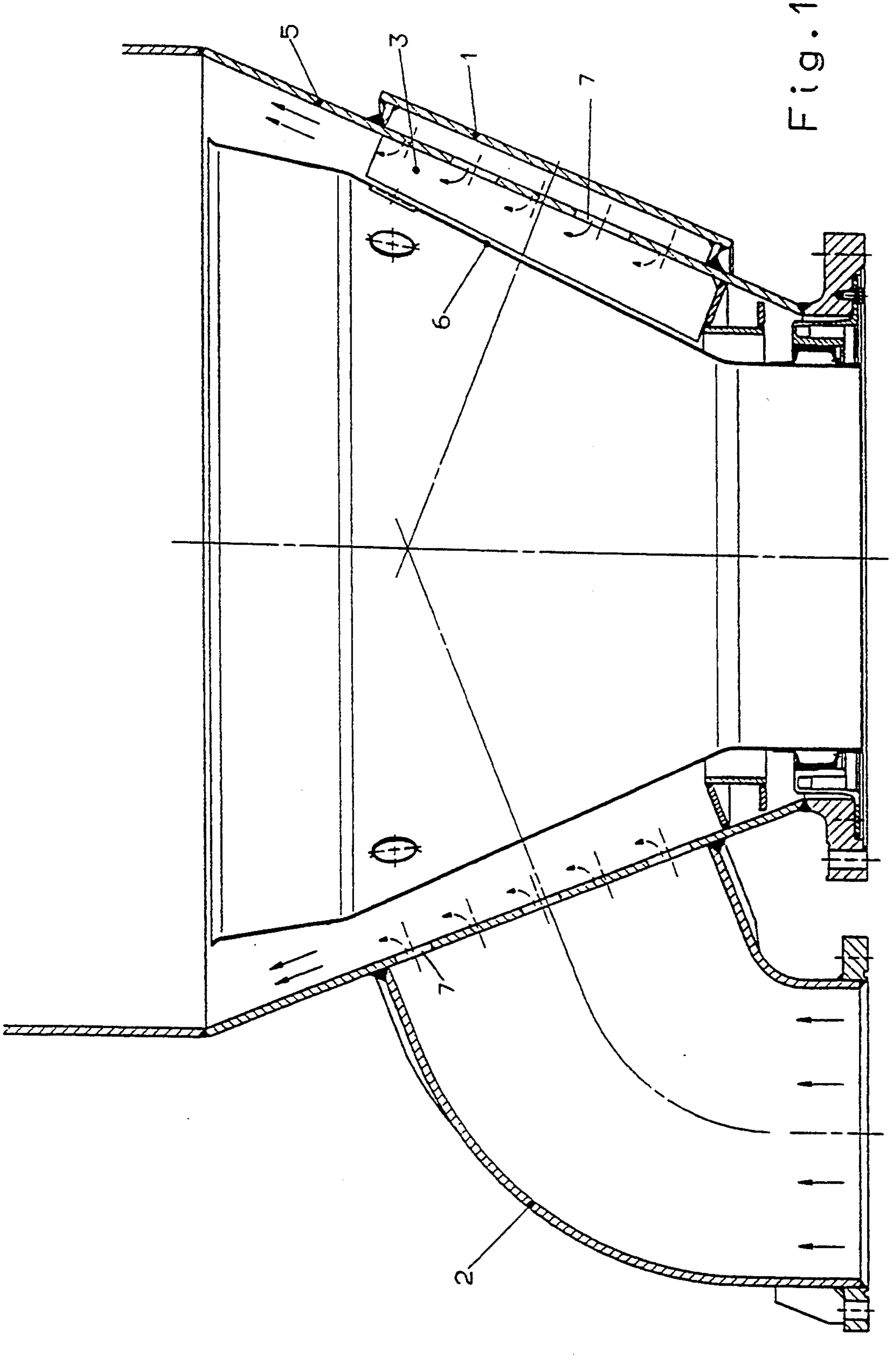
FIG. 1 is a cross sectional view of the combustion chamber housing.

FIG. 1 shows a cross section of the lower part of the combustion chamber housing with the design of the air feed area according to the present invention, with an air inlet elbow 2, an intake distribution means including an intake distribution element or intake heart 1, and a perforated cone or conical member 5. As a result of which, a uniform distribution of air due to conversion of a tangential flow into an axial flow in the combustion chamber housing, and sufficient cooling of the injector tube 6 are achieved.

The compressor air, represented by arrows, is fed into the lower, conical part of the combustion chamber housing (the perforated cone 5) through a lateral, arc-shaped inlet elbow 2. The inlet elbow 2 is joined by the intake distribution element 1, in which the compressor air is led around the perforated cone 5 on both sides.

Figure 2:
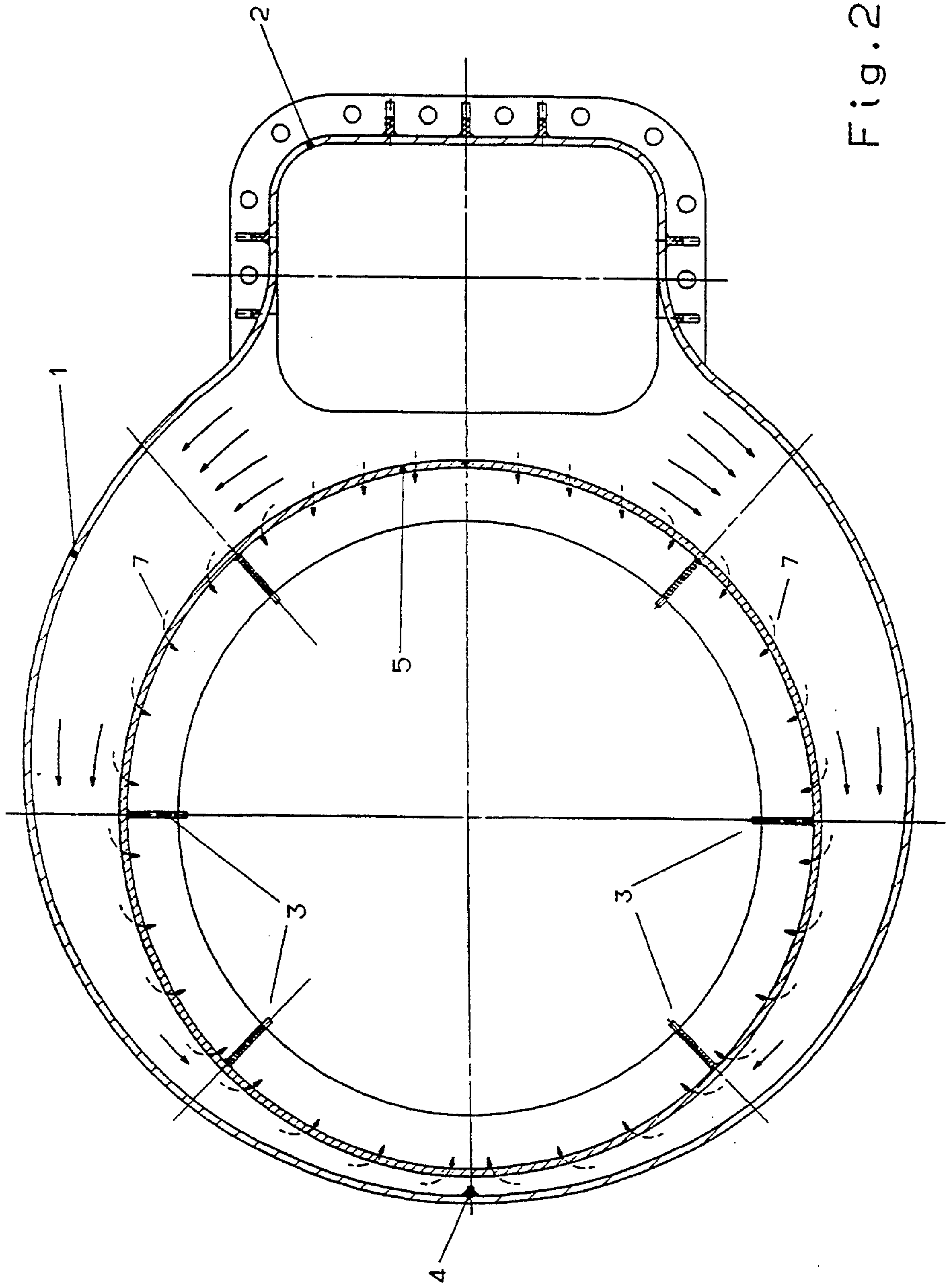
FIG. 2 is a top view of the combustion chamber housing.

As is apparent from FIG. 2, the conversion of the tangential flow into an axial flow through the holes in the perforated cone 5 is achieved due to the reduction of the cross-sectional area of the intake distribution means due to the shape of the intake distribution element or intake heart 1 and the reduction in distance between the perforated cone 5 and the circumferential intake distribution element 1 with increasing amount of compressor air.

Thus, the residual cross section of the intake distribution means 1 continuously decreases toward the opposite side of the inlet elbow 2. The two air flows again meet at this point at the flow divider 4. The compressor air flowing through the holes 7 in the perforated cone 5 strikes the likewise conical injector tube 6 in the interior of the combustion chamber housing.

Figure 3:
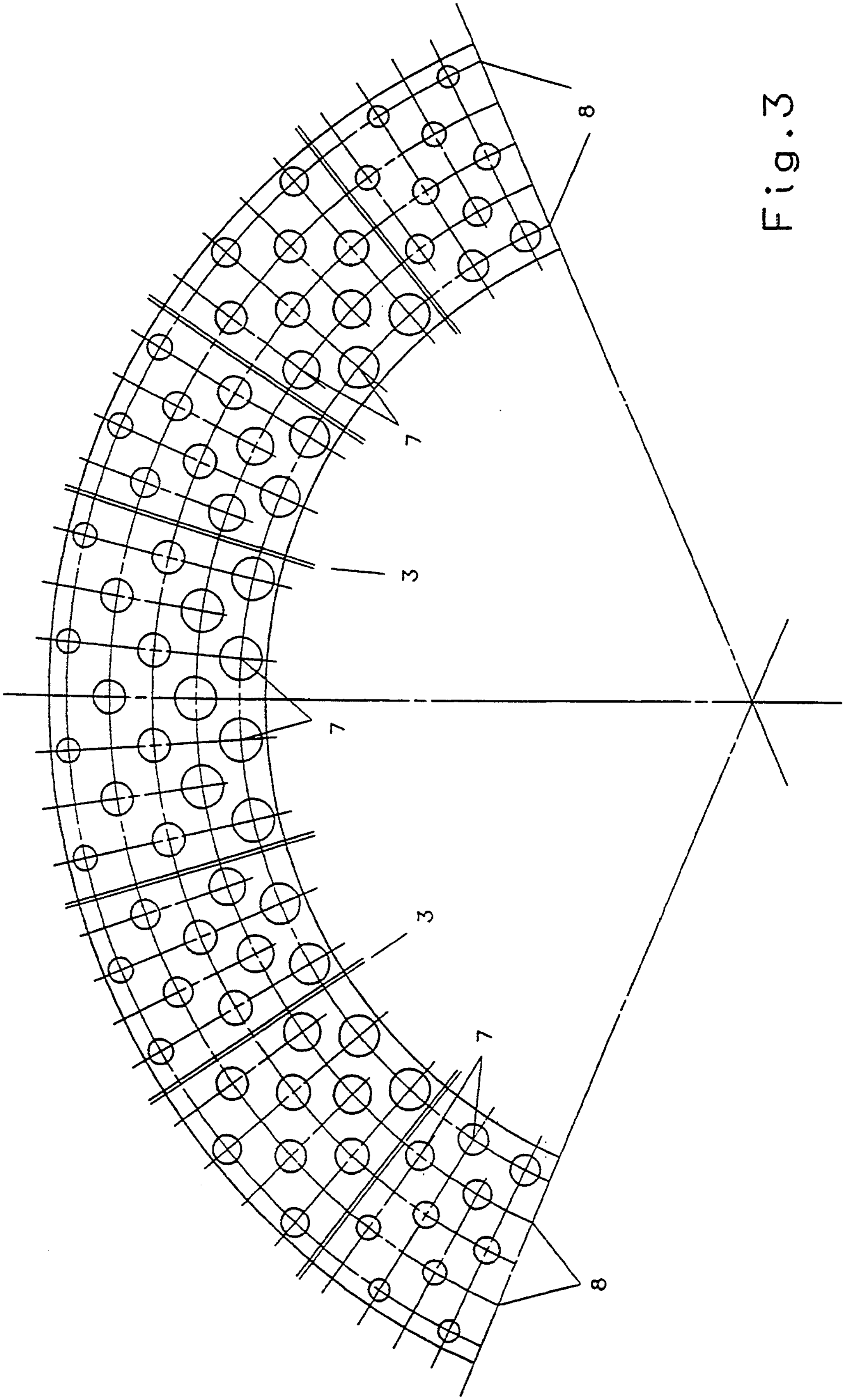
FIG. 3 is a developed view of the perforated cone.

As is apparent from the developed view of the perforated cone 5 in FIG. 3, the holes 7 in the perforated cone 5 are arranged and dimensioned such that the open cross section of the holes 7 increases from front to rear as well as from top to bottom.

The holes 7 in the perforated cone 5 are arranged on five circumferential lines 8 arranged in parallel such that they are always staggered.

The conversion of the tangential flow into an axial flow, and the uniform cooling of the injector tube 6, which is achieved as a result, is supported by the radially arranged ribs 3. As a result, the compressor air flowing through the inlet elbow 2 obliquely upward and to the rear is prevented from cooling only the upper area of the injector tube 6 and from cooling the rear, lower area of the injector tube 6 only insufficient if at all.

While a specific embodiment of the invention has been shown and described in detail to illustrate the application of the principles of the invention, it will be understood that the invention may be embodied otherwise without departing from such principles.

What is claimed is:

1. Cylindrical combustion chamber housing of a gas turbine, comprising:
- a conical injector tube;
- a perforated cone, arranged circularly around said conical injector tube;
- a bladeless inlet elbow for admitting compressor air through openings of said perforated cone into the interior of the combustion chamber, said inlet elbow being formed as an arc-shaped inlet elbow arranged laterally to the combustion chamber housing and attached to the combustion chamber housing;
- flow distribution means for distribution of flow from said arc-shaped inlet elbow to said openings into said interior of the combustion chamber and for converting tangential flow to axial flow, said flow distribution means including a substantially circular intake element which is led on both sides around the combustion chamber housing.

2. Cylindrical combustion chamber housing of a gas turbine in accordance with claim 1, wherein guide ribs are arranged radially between said perforated cone and said injector tube.

3. Cylindrical combustion chamber housing of a gas turbine in accordance with claim 1 wherein said perforated cone is formed with a plurality of holes arranged and dimensioned such that an open cross section of the holes increases from a wide end to a narrow end of said perforated cone and from the inlet elbow to a flow divider positioned in the flow distribution means and substantially opposite said inlet elbow.

4. Cylindrical combustion chamber housing of a gas turbine in accordance with claim 2 wherein said perforated cone is formed with a plurality of holes arranged and dimensioned such that an open cross section of the holes increases from a wide end to a narrow end of said perforated cone and from the inlet elbow to a flow divider positioned in the flow distribution means and substantially opposite said inlet elbow.

5. Cylindrical combustion chamber housing of a gas turbine in accordance with claim 1, wherein said holes in the perforated cone are arranged on a plurality of circumferential lines, and the holes are arranged staggered in relation to one another.

6. Cylindrical combustion chamber housing of a gas turbine, comprising:
- a conical injector tube;
- a conical perforated member positioned circularly around said conical injector robe, said conical perforated member defining a plurality of holes;
- an inlet elbow positioned radially outside said conical perforated member at an inlet point;
- flow distribution means for distribution of radial flow from said inlet elbow though said plurality of holes of said conical perforated member and toward said conical injector tube and for converting tangential flow to axial flow, said flow distribution means including a substantially circular intake element which is circumferentially led around said conical perforated member in opposite directions from said inlet elbow, said conical perforated member and said substantially circular intake element defining an annular channel narrowing from said inlet elbow to a flow divider point substantially opposite said inlet elbow.

7. Cylindrical combustion chamber housing of a gas turbine in accordance with claim 6, further comprising:
- guide ribs positioned radially between said conical injector tube and said conical perforated member.

8. Cylindrical combustion chamber housing of a gas turbine in accordance with claim 6, wherein:
- said plurality of holes in said conical perforated member has an open cross sectional area, and said open cross sectional area of said plurality of holes increases as a position of said plurality of holes is closer to a narrow end of said conical perforated member.

9. Cylindrical combustion chamber housing of a gas turbine in accordance with claim 6, wherein:
- said plurality of holes in said conical perforated member has an open cross sectional area, and said open cross sectional area of said plurality of holes increases as a position of said plurality of holes extends from said inlet elbow to said flow divider point.

10. Cylindrical combustion chamber housing of a gas turbine in accordance with claim 6, wherein:
- said plurality of holes in said conical perforated member are arranged on a plurality of circumferential lines, and said plurality of holes are arranged staggered in relation to one another.

11. Cylindrical combustion chamber housing of a gas turbine in accordance with claim 6, wherein:
- said annular channel narrows to maintain a flow velocity from said inlet elbow to said flow divider point substantially constant.

12. Cylindrical combustion chamber housing of a gas turbine in accordance with claim 6, wherein:

said annular channel narrows to maintain a flow velocity from said inlet elbow to said flow divider point substantially constant;

guide ribs are positioned radially between said conical injector tube and said conical perforated member;

said plurality of holes in said conical perforated member has an open cross sectional area, and said open cross sectional area of said plurality of holes increases as a position of said plurality of holes is closer to a narrow end of said conical perforated member, and said open cross sectional area of said plurality of holes increases as a position of said plurality of holes is extends from said inlet elbow to said flow divider point;

said plurality of holes in said conical perforated member are arranged on a plurality of circumferential lines, and said plurality of holes are arranged staggered in relation to one another.

* * * * *